S. H. Mitchell,
Portable Fence,
No. 55,883. Patented June 26, 1866.
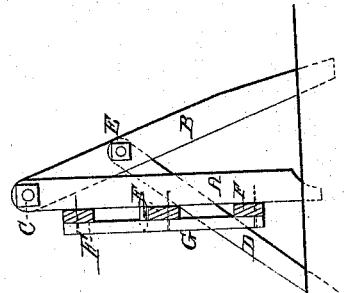
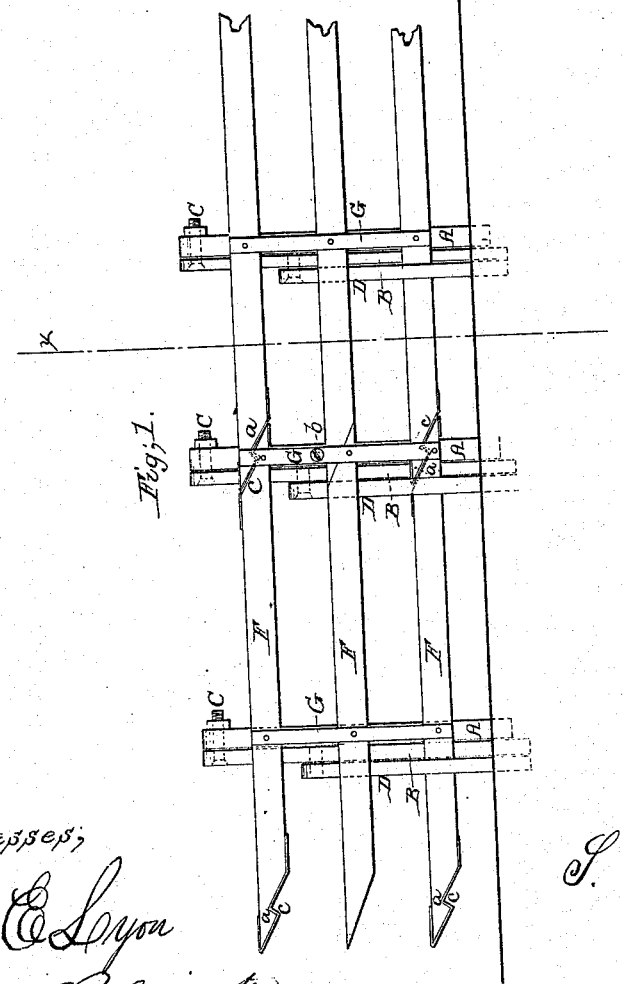
Witnesses;
Wm E Lyon
Inventor;
S. H. Mitchell
Munn & Co
Attorneys

UNITED STATES PATENT OFFICE.

S. H. MITCHELL, OF EL PASO, ILLINOIS.

IMPROVEMENT IN FENCES.

Specification forming part of Letters Patent No. 55,883, dated June 26, 1866.

*To all whom it may concern:*

Be it known that I, S. H. MITCHELL, of El Paso, in the county of Woodford and State of Illinois, have invented a new and Improved Fence; and I do hereby declare that the following is a full, clear, and exact description thereof, which will enable others skilled in the art to make and use the same, reference being had to the acccompanying drawings, forming part of this specification, in which—

Figure 1 is a side view of two panels of a fence constructed according to my invention; Fig. 2 a transverse vertical section of the same, taken in the line *x x*, Fig. 1.

Similar letters of reference indicate like parts.

This invention relates to a new and improved fence of that class which are designed to be readily put up and taken down, and are commonly termed "portable fences."

The invention consists in covering the notched ends of the slats of the panels, where they are locked together, with iron, in order to preserve said ends or prevent them from splitting, and also in a novel arrangement or application of the stakes of the fence and the securing of the notched ends of the panels in position, as hereinafter fully shown and described, whereby it is believed that a very simple, economical, and durable fence of the class specified is obtained.

A represents a series of upright posts, there being two or more to each panel. Each of these posts has a stake, B, secured to its upper end by a screw-bolt, C, and each stake B has another stake, D, secured to it some distance below its top by a bolt, E, as shown clearly in Fig. 2.

To the upright posts A there are secured horizontal parallel slats F, said slats having upright strips or battens G attached to them, through which and the slats nails are driven into the posts A.

The ends of the slats F are notched, as shown at *a* in Fig. 1, said notches being formed in such a manner that the abutting ends of the slats of the panels, when placed in contact, will become locked and the panels prevented from spreading apart or separating in a longitudinal direction.

In order to prevent the slats of one panel from rising above those of the other and becoming unlocked, a screw, *b*, is screwed through the strip or batten G, opposite the locked joints, into the post A at the rear side of the latter, and directly over the abutting ends of two of the slats, as shown clearly in Fig. 2, which prevents the panel from rising.

The stakes D pass over the lower slats, F, of the panels and bear upon the upper edges of the same, the ends of both stakes, B D, being driven into the ground.

By this arrangement it will be seen that the panels of the fence will be firmly braced and held down to the ground, while the notched ends of the slats securely hold the panels in contact, preventing them from parting longitudinally, and the screw *b* preventing the slats from unlocking by a vertical movement of the panels.

The notched ends of the panels, if not protected, would be very liable to split or check, so as to destroy the locks; and in order to prevent this I cover the notched ends with sheet metal or strap-iron *c*, as shown clearly in Fig. 1, which effectually protects the ends of the slats.

This fence may be very readily put up and economically constructed, and will be strong and durable.

I do not claim, broadly, the notched or locked ends of the slats of the panels; nor do I claim the employment of inclined stakes irrespective of the arrangement of the same, as herein set forth; but I do claim as new and desire to secure by Letters Patent—

1. The stakes B D, connected by bolts C, in combination with the upright posts A of the panels, with which posts the upper ends of the stakes B are connected by bolts E, substantially as and for the purpose specified.

2. The covering of the notched ends of the slats F of the panels with sheet metal or strap-iron *c*, substantially as and for the purpose set forth.

3. The securing of the panels, so as to prevent a vertical movement of the same, by means of a screw, *b*, or its equivalent, applied as shown, when used in combination with the notched ends of the slats F of the panels, substantially as described.

S. H. MITCHELL.

Witnesses:
D. DRIGGS,
JOHN TORRANCE.